United States Patent
Tokoro et al.

(10) Patent No.: US 10,384,305 B2
(45) Date of Patent: Aug. 20, 2019

(54) METAL JOINING METHOD AND METAL-JOINED MEMBER

(71) Applicant: HONDA MOTOR CO., LTD., Tokyo (JP)

(72) Inventors: Yosuke Tokoro, Wako (JP); Mitsuru Sayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 15/368,681

(22) Filed: Dec. 5, 2016

(65) Prior Publication Data

US 2017/0182587 A1 Jun. 29, 2017

(30) Foreign Application Priority Data

Dec. 24, 2015 (JP) .................. 2015-252687

(51) Int. Cl.
| | | |
|---|---|---|
| *B23K 20/12* | (2006.01) | |
| *B23K 101/06* | (2006.01) | |
| *B23K 103/18* | (2006.01) | |
| *B23K 103/20* | (2006.01) | |

(52) U.S. Cl.
CPC ........ *B23K 20/1265* (2013.01); *B23K 20/123* (2013.01); *B23K 20/129* (2013.01); *B23K 2101/06* (2018.08); *B23K 2103/18* (2018.08); *B23K 2103/20* (2018.08)

(58) Field of Classification Search
None
See application file for complete search history.

(56) References Cited

U.S. PATENT DOCUMENTS

| | | | | | |
|---|---|---|---|---|---|
| 5,697,544 | A | * | 12/1997 | Wykes ................. | B23K 20/125 156/580 |
| 8,434,661 | B2 | * | 5/2013 | Hovanski ........... | B23K 20/1255 228/112.1 |
| 8,556,156 | B1 | * | 10/2013 | Bharadwaj ......... | B23K 20/1235 228/102 |

(Continued)

FOREIGN PATENT DOCUMENTS

| | | |
|---|---|---|
| JP | 2006-192501 | 7/2006 |
| JP | 5645395 B2 | 6/2011 |

(Continued)

OTHER PUBLICATIONS

Japanese Office Action for corresponding JP Application No. 2015-252687, dated Jun. 13, 2017.

*Primary Examiner* — Devang R Patel
(74) *Attorney, Agent, or Firm* — Mori & Ward, LLP (57) ABSTRACT

A dissimilar metal joining method includes moving a tool on a first metal along a first track on an overlapped part where the first metal is overlapped on a second metal while the tool is rotated around an axis of the tool and is pressed along the axis against the first metal such that the tool penetrates the first metal and is inserted into the second metal by a first insertion depth. The tool is moved from the first track to a second track which is on the overlapped part and which is substantially parallel to the first track after the tool has moved along an entirety of the first track. The tool is moved on the first metal along the second track on the overlapped part while the tool is rotated around the axis and is pressed against the first metal along the axis.

18 Claims, 7 Drawing Sheets

(56) References Cited

U.S. PATENT DOCUMENTS

| | | | |
|---|---|---|---|
| 2005/0133567 A1* | 6/2005 | Runyan | B21D 26/055 228/112.1 |
| 2005/0139640 A1 | 6/2005 | Kay | |
| 2006/0086775 A1* | 4/2006 | Trapp | B23K 20/1225 228/112.1 |
| 2009/0120995 A1* | 5/2009 | Hallinan | B23K 20/1255 228/2.3 |
| 2009/0255980 A1* | 10/2009 | Li | B23K 20/123 228/102 |
| 2010/0089977 A1* | 4/2010 | Chen | B23K 20/122 228/114.5 |
| 2011/0268494 A1* | 11/2011 | Pacchione | B23K 20/1265 403/270 |
| 2015/0115019 A1* | 4/2015 | Pascal | B23K 20/125 228/112.1 |
| 2015/0209893 A1* | 7/2015 | Hori | B23K 20/1225 228/112.1 |
| 2015/0231734 A1* | 8/2015 | Okada | B23K 20/123 228/2.1 |

FOREIGN PATENT DOCUMENTS

| | | |
|---|---|---|
| JP | 2015-131323 | 7/2015 |
| JP | 2015-150610 | 8/2015 |

* cited by examiner

METAL JOINING METHOD AND METAL-JOINED MEMBER

CROSS-REFERENCE TO RELATED APPLICATIONS

The present application claims priority under 35 U.S.C. § 119 to Japanese Patent Application No. 2015-252687, filed Dec. 24, 2015. The contents of this application are incorporated herein by reference in their entirety.

BACKGROUND OF THE INVENTION

Field of the Invention

The present invention relates to a metal joining method and a metal-joined member.

Discussion of the Background

Japanese Patent Application Publication No. 2015-150610 and Japanese Patent No. 5645395 discloses a method of joining two dissimilar metal members, so-called friction stir welding in which both metal members are joined through solid-phase welding without fusing the base material, by rotating a rotary tool configured of a pin (probe) provided on a tip end center part and a columnar rotor called a shoulder, while pressing the tool down on a joint part (overlapped part) where both metal members overlap one another, and moving the tool in the horizontal direction.

Figure 5A:
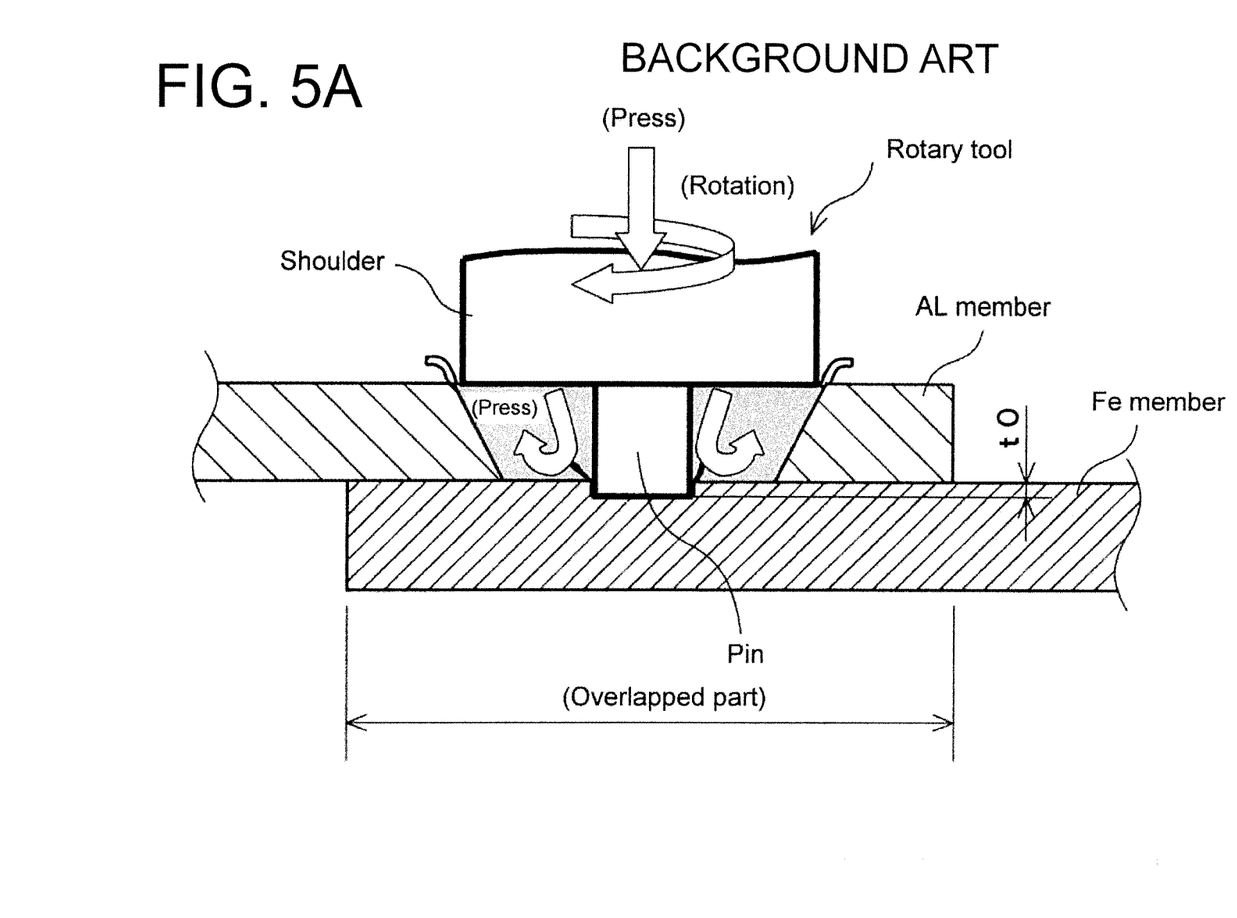
FIG. 5A is an explanatory drawing showing metal joining of a steel member and an aluminum member by conventional friction stir welding.
Figure 5B:
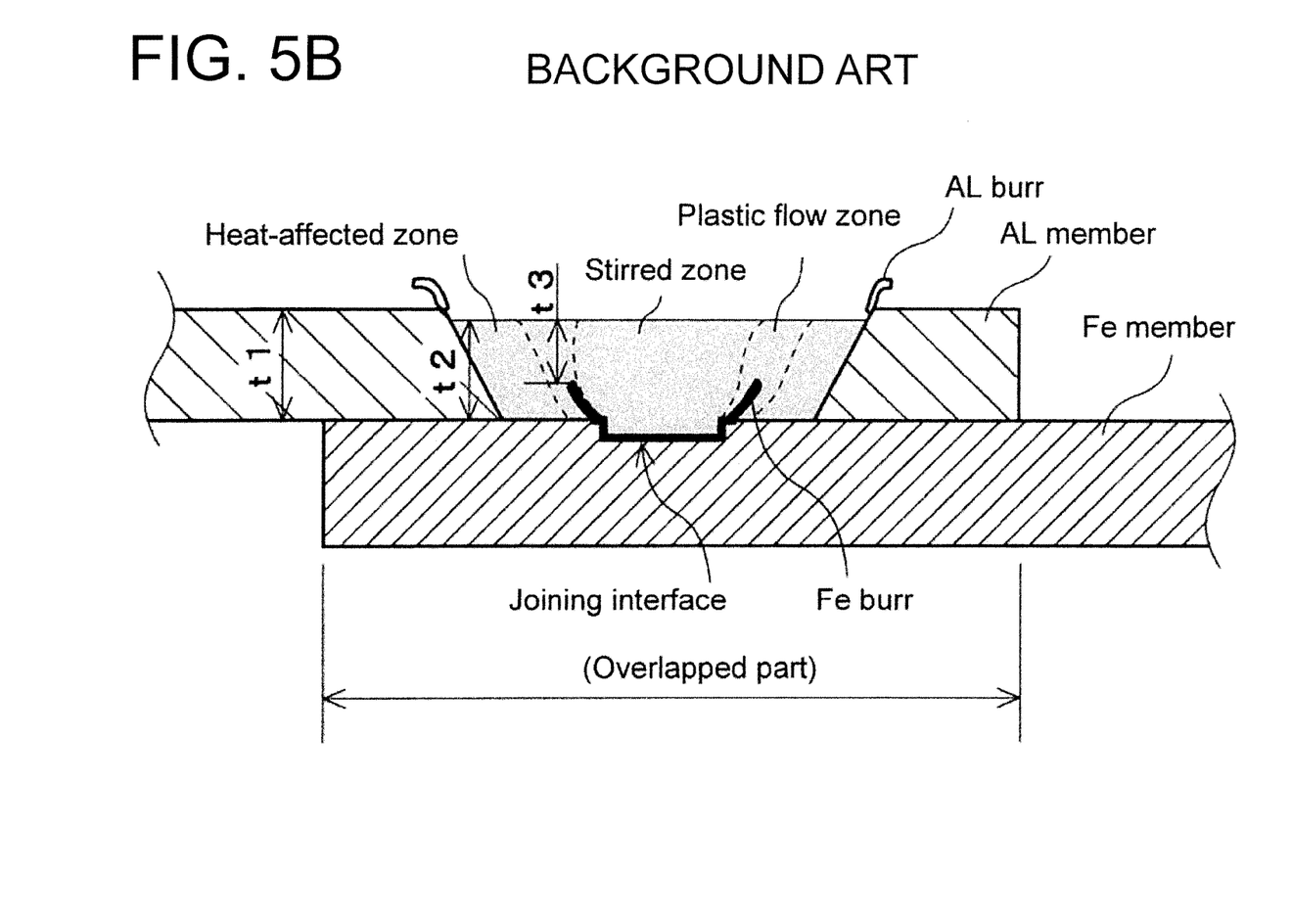
FIG. 5B is an explanatory drawing showing metal joining of a steel member and an aluminum member by conventional friction stir welding.

FIGS. 5A and 5B are explanatory drawings showing metal joining of a steel member and an aluminum member by conventional friction stir welding.

As shown in FIG. 5A, in conventional friction stir welding, frictional heat is generated between the shoulder and the aluminum member (AL member), by rotating the rotary tool while pressing it down perpendicularly on a part where the steel member and the aluminum member overlap one another. The frictional heat softens the aluminum member, and the pin provided on the tip end center part stirs the softened aluminum member. At the same time, a lower surface of the shoulder presses the softened and stirred aluminum member. Thus, the vicinity of the joining interface between both metal members is stably joined by solid-phase welding.

As shown in FIG. 5B, apart where the rotary tool has passed has a crystalline structure including a stirred zone, a plastic flow zone outside the stirred zone, and a heat-affected zone outside the plastic flow zone.

Note that the friction stir welding method described in the Japanese Patent Application Publication No. 2015-150610 is characterized in that when drawing a rotary tool at an end part, it is drawn while being moved in the horizontal direction to prevent exposure of a metal surface.

Meanwhile, the friction stir welding method described in the above Japanese Patent No. 5645395 is characterized in that both metal members are joined, by moving a rotary tool such that it is shifted from a joint centerline at a starting point.

SUMMARY

According to one aspect of the present invention, a dissimilar metal joining method includes applying friction stir welding along a tangential direction over a predetermined length on an overlapped part where a first metal and a second metal made of different materials overlap one another, by moving a tool along the tangential direction while rotating and pressing the tool down on the overlapped part of the first metal and the second metal, characterized in that: the overlapped part is subjected to friction stir welding by the tool at least twice; in the first friction stir welding, the tool is moved along the tangential direction with the tool penetrating the first metal and inserted into the second metal for a predetermined depth; and in the second friction stir welding, the tool is moved along the tangential direction with a position of the tool offset for a predetermined distance in a direction perpendicular to the tangential direction.

According to another aspect of the present invention, in a dissimilar metal joining method, a tool is moved on a first metal along a first track on an overlapped part where the first metal is overlapped on a second metal while the tool is rotated around an axis of the tool and is pressed along the axis against the first metal such that the tool penetrates the first metal and is inserted into the second metal by a first insertion depth. The first metal is made of a first material which is different from a second material which the second metal being made of. The first metal and the second metal are joined at the first track via a friction stir welding. The tool is moved from the first track to a second track which is on the overlapped part and which is substantially parallel to the first track after the tool has moved along an entirety of the first track. The tool is moved on the first metal along the second track on the overlapped part while the tool is rotated around the axis and is pressed against the first metal along the axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1A:
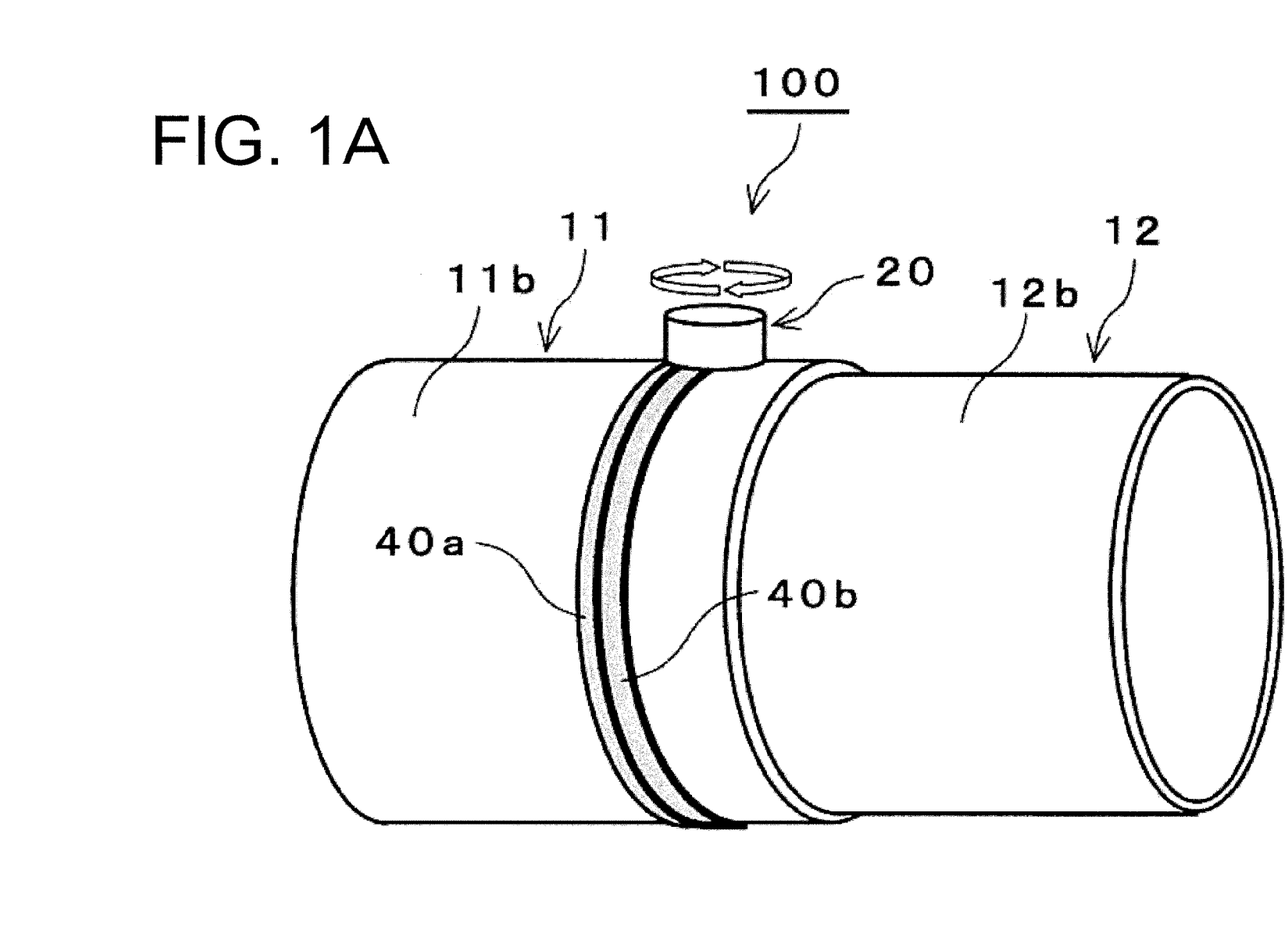
FIG. 1A is an explanatory drawing showing a dissimilar metal shaft to which a dissimilar metal joining method of an embodiment of the present invention is applied.
Figure 1B:
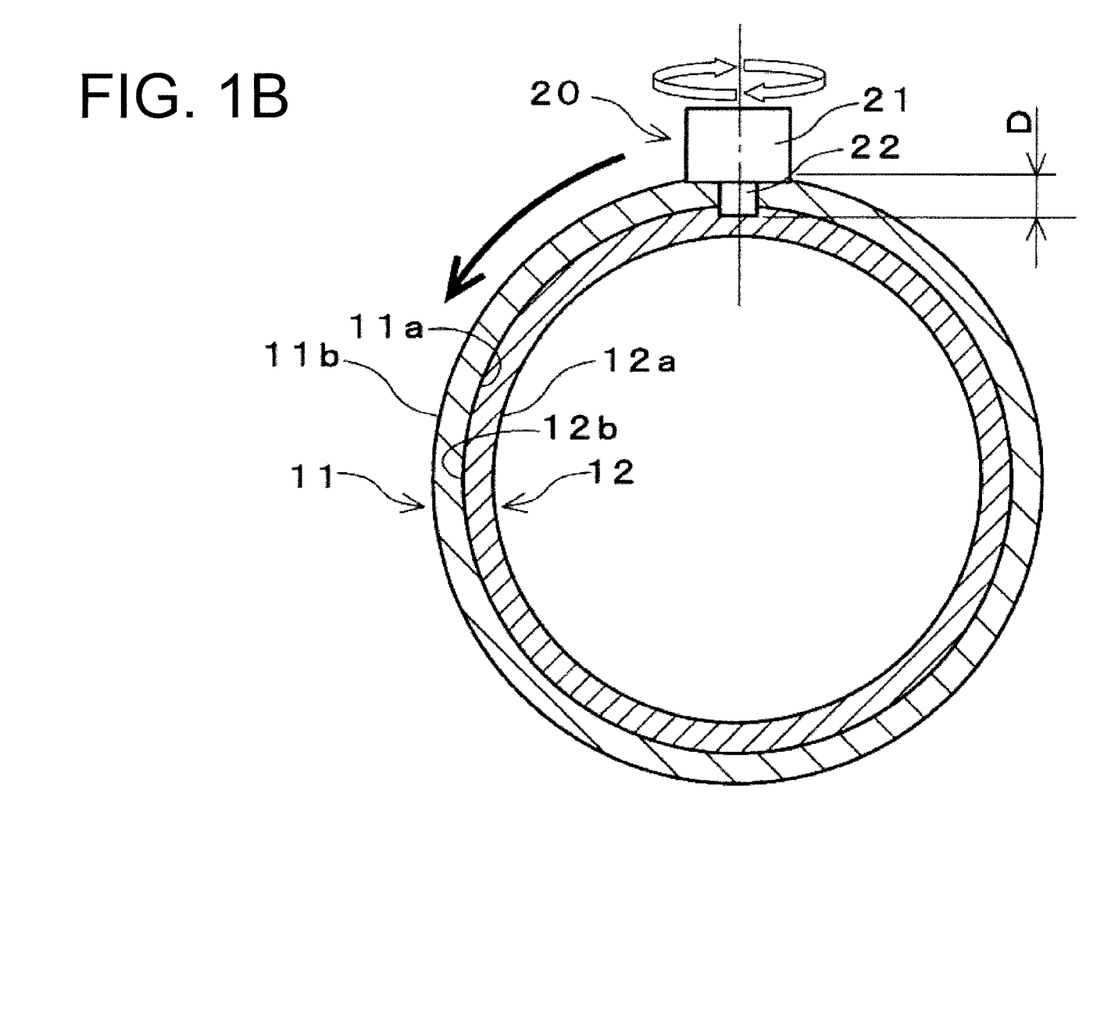
FIG. 1B is an explanatory drawing showing a dissimilar metal shaft to which a dissimilar metal joining method of an embodiment of the present invention is applied.

FIGS. 1A and 1B are explanatory drawings showing a dissimilar metal shaft 100 to which a dissimilar metal joining method of an embodiment of the present invention is applied. Note that FIG. 1A is a perspective view of the dissimilar metal shaft 100, and FIG. 1B is a cross-sectional explanatory drawing of a main part of the dissimilar metal shaft 100. A friction stir welding tool 20 is also shown in FIGS. 1A and 1B as a reference.

The dissimilar metal shaft 100 is configured of a first shaft 11, and a second shaft 12 press-fitted into an inner surface of the first shaft 11. The first shaft 11 is a cylindrical hollow shaft entirely made of a light metal, such as aluminum or an aluminum alloy. Meanwhile, the second shaft 12 is a cylindrical hollow shaft made of an iron-based metal such as stainless steel, and is concentric with the first shaft 11.

Also, the friction stir welding tool 20 is configured of a shoulder 21 as a cylindrical rotor, and a pin 22 provided at the center on a lower surface of the shoulder 21. Although details will be described later with reference to FIGS. 2 and 3, the first shaft 11 and the second shaft 12 are joined by applying friction stir welding for two laps along the circumferential direction, while pressing down the friction stir welding tool 20 on an axially-overlapped portion 40 (FIG. 2), where an inner surface 11a of the first shaft 11 and an outer surface 12b of the second shaft 12 overlap one another in the axial direction.

Figure 2:
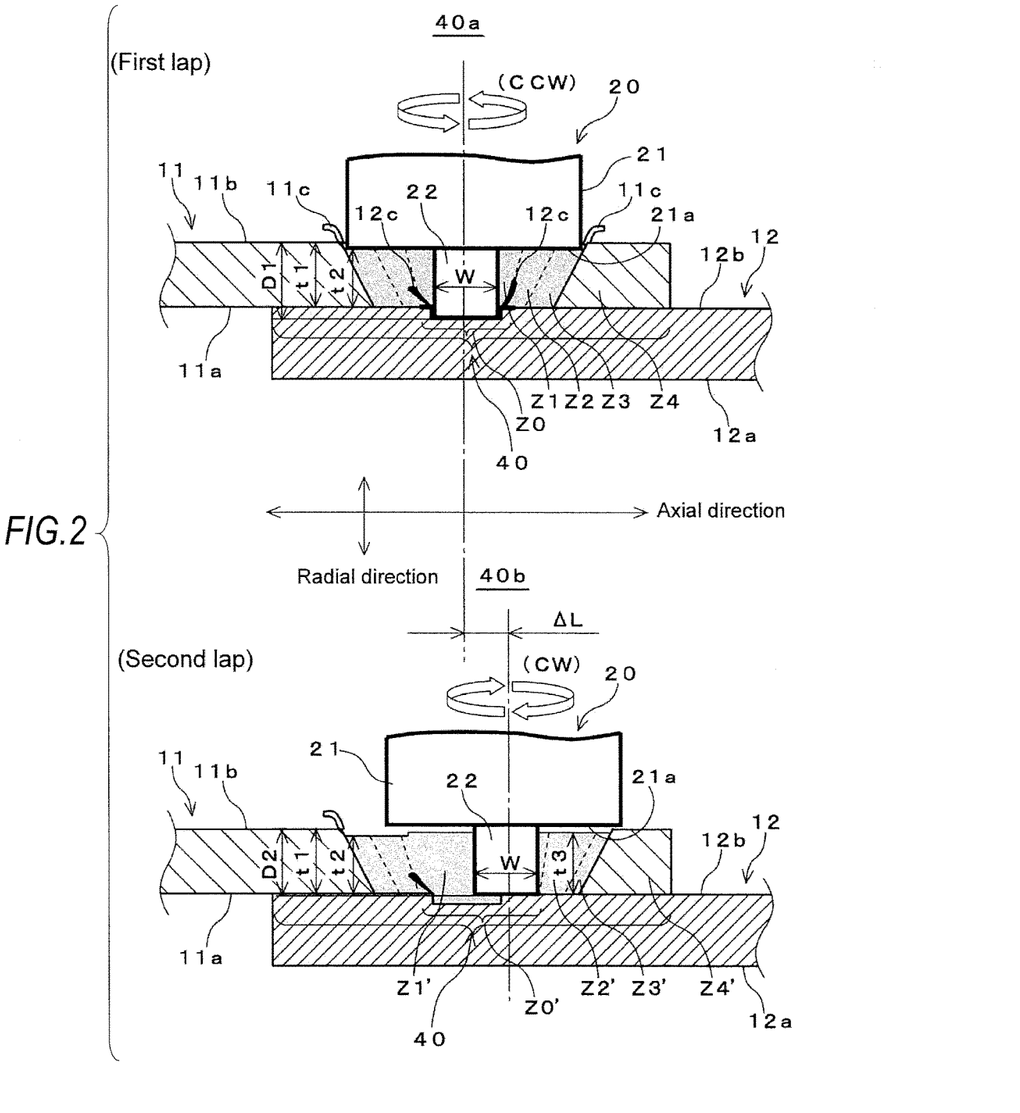
FIG. 2 is an explanatory drawing showing friction stir welding of a first lap, and friction stir welding of a second lap of the embodiment.

Additionally, not only is the axial position of the friction stir welding tool 20 varied, but also an insertion depth D of the friction stir welding tool 20 into the first shaft 11 and the second shaft 12 is varied between the first lap-friction stir welding 40a and the second lap-friction stir welding 40b.

Moreover, other joining conditions (rotation direction, rotation speed, and speed of movement along circumferential direction of friction stir welding tool 20) are also varied between the first lap-friction stir welding 40a and the second lap-friction stir welding 40b.

The circumferential strip-like first lap-friction stir welding 40a (a first track) and the second lap-friction stir welding 40b are (a second track) formed on an outer surface 11b of the first shaft 11, in such a manner as to be offset (shifted) from each other in the axial direction.

FIG. 2 is an explanatory drawing showing the first lap-friction stir welding 40a and the second lap-friction stir welding 40b of the embodiment. An upper part of FIG. 2 shows the first lap-friction stir welding 40a, and a lower part of FIG. 2 shows the second lap-friction stir welding 40b.

As shown in the upper part of FIG. 2, the friction stir welding tool 20 is moved along the circumferential direction of the first shaft 11, while being rotated and pressed radially inward. The shoulder 21 presses the first shaft 11 with a shoulder lower surface 21a while rotating, and thereby generates frictional heat between itself and the first shaft 11. The frictional heat softens a part of the first shaft 11 adjacent to the shoulder lower surface 21a, and the pin 22 stirs the softened part.

Apart (friction stir welding 40a) where the friction stir welding tool 20 has passed has a stirred zone Z1 where the crystalline structure is the finest at the center, a plastic flow zone Z2 outside the stirred zone, a heat-affected zone Z3 where stirring is insufficient outside the plastic flow zone Z2, and a base material-unaffected zone Z4 where the original shape of the base material is maintained, outside the heat-affected zone Z3.

As the friction stir welding tool 20 moves radially inward while rotating, the pin 22 drills into the outer surface 12b of the second shaft 12 for an insertion depth of about several millimeters (=D1−t1). As a result, the true surface is exposed on the outer surface 12b of the second shaft 12, and a stable solid-phase bond (metal bond) is formed between the true surface and the stirred zone Z1 and plastic flow zone Z2, whereby the first shaft 11 and the second shaft 12 are combined stably.

However, while the friction stir welding tool 20 moves radially inward while rotating, the shoulder lower surface 21a presses the softened aluminum base material. Hence, a part of the aluminum flakes off from the outer surface 11b of the first shaft 11 as AL burr 11c. Due to the flaking of the AL burr 11c, a recess (reduced thickness part of thickness t2) is formed in the friction stir welding 40a. If a tensile or bending load acts on the first shaft 11, the reduced thickness part (recess) in the outer surface 11b causes stress concentration in the reduced thickness part, and consequently degrades bonding strength in a joining interface-zone Z0.

Similarly, as the pin 22 of the friction stir welding tool 20 drills into the outer surface 12b of the second shaft 12 for the insertion depth of about several millimeters (=D1−t1), a part of the stainless steel flakes off from the outer surface 12b as steel burr 12c. The flaking of the steel burr 12c reduces the substantial thickness of the stirred zone Z1 and plastic flow zone Z2. Accordingly, if a tensile or bending load acts on the first shaft 11, stress concentrates in the stirred zone Z1 and plastic flow zone Z2 through the crack (steel burr), so that bonding strength in the joining interface-zone Z0 is deteriorated as in the case of the aforementioned recess.

Hence, in the second lap-friction stir welding 40b, the AL burr 11c is returned to the outer surface 11b of the first shaft 11 and recombined, to fill up the recess. Meanwhile, the steel burr 12c is removed from the outer surface 12b of the second shaft 12, so that the substantial decrease in thickness of the stirred zone Z1 and plastic flow zone Z2 can be eliminated. Hereinbelow, the second lap-friction stir welding 40b will be described.

As shown in the lower part of FIG. 2, the axial position of the friction stir welding tool 20 is offset from the axial position thereof in the first lap-friction stir welding 40a. Note that a distance AL for which the friction stir welding tool is offset is not larger than a width W of the pin 22.

Also, an insertion depth (D2) of the friction stir welding tool 20 is shallower than the insertion depth (D1) in the first lap-friction stir welding 40a. Note that in the second lap-friction stir welding 40b, the pin 22 need not come into contact with the outer surface 12b of the second shaft 12, as long as the pin 22 abuts on the steel burr 12c and thereby incorporates the steel burr 12c into the outer surface 12b of the second shaft 12. It is preferable that the height of the pin 22 is substantially the same as the thickness t1 of the first shaft 11.

Also, according to a property that a specific rotation direction of the friction stir welding tool 20 results in more AL burr 11c, the rotation direction of the friction stir welding tool 20 is reversed from that in the first lap-friction stir welding 40a. For example, if the first lap-friction stir welding 40a is counter clockwise (CCW), the second lap-friction stir welding 40b is clockwise (CW).

Additionally, the rotation speed of the friction stir welding tool 20 is slower than that in the first lap-friction stir welding 40a. This is to reduce the amount of heat generated by friction between the shoulder and the base material, so that the influence of the newly generated heat-affected zone on bonding strength can be minimized.

Similarly, the moving speed of the friction stir welding tool 20 is faster than that in the first lap-friction stir welding 40a. This is to keep the frictional heat generated by friction between the shoulder and the base material from being transmitted to the base material, to prevent generation of additional heat-affected zones.

Thus, in the second lap-friction stir welding 40b, the axial insertion position, insertion depth (D2), rotation direction, rotation speed, and moving speed of the friction stir welding tool 20 are varied from those in the first lap-friction stir welding 40a, to return the AL burr 11c generated by the first lap-friction welding 40a to the base material for recombination. This repairs the recess (reduced thickness) on the surface of the aluminum base material. As a result, bonding strength between the first shaft 11 and the second shaft 12 is improved.

Also, the heat-affected zone Z3 of the first lap is stirred further in the second lap-friction stir welding 40b, and after refining of the structure, is regenerated into a stirred zone or a plastic flow zone. Thus, a stirred zone Z1' and a plastic flow zone Z2' of the second lap-friction stir welding 40b become larger than the stirred zone Z1 and the plastic flow zone Z2 of the first lap. In contrast, a heat-affected zone Z3' of the second the second lap-friction stir welding 40b becomes smaller than the heat-affected zone Z3 of the first lap. As a result, a joining interface-zone Z0' of the second lap-friction stir welding 40b becomes larger than the joining interface-zone Z0 of the first lap. Hence, bonding strength between the first shaft 11 and the second shaft 12 is improved.

Instead of reversing the rotation direction of the friction stir welding tool 20 from that in the first lap-friction stir welding 40a, to achieve a similar effect, the moving direction of the friction stir welding tool 20 may be reversed from that in the first lap-friction stir welding 40a. Herein below, a description will be given of the moving direction of the friction stir welding tool 20.

Figure 3:
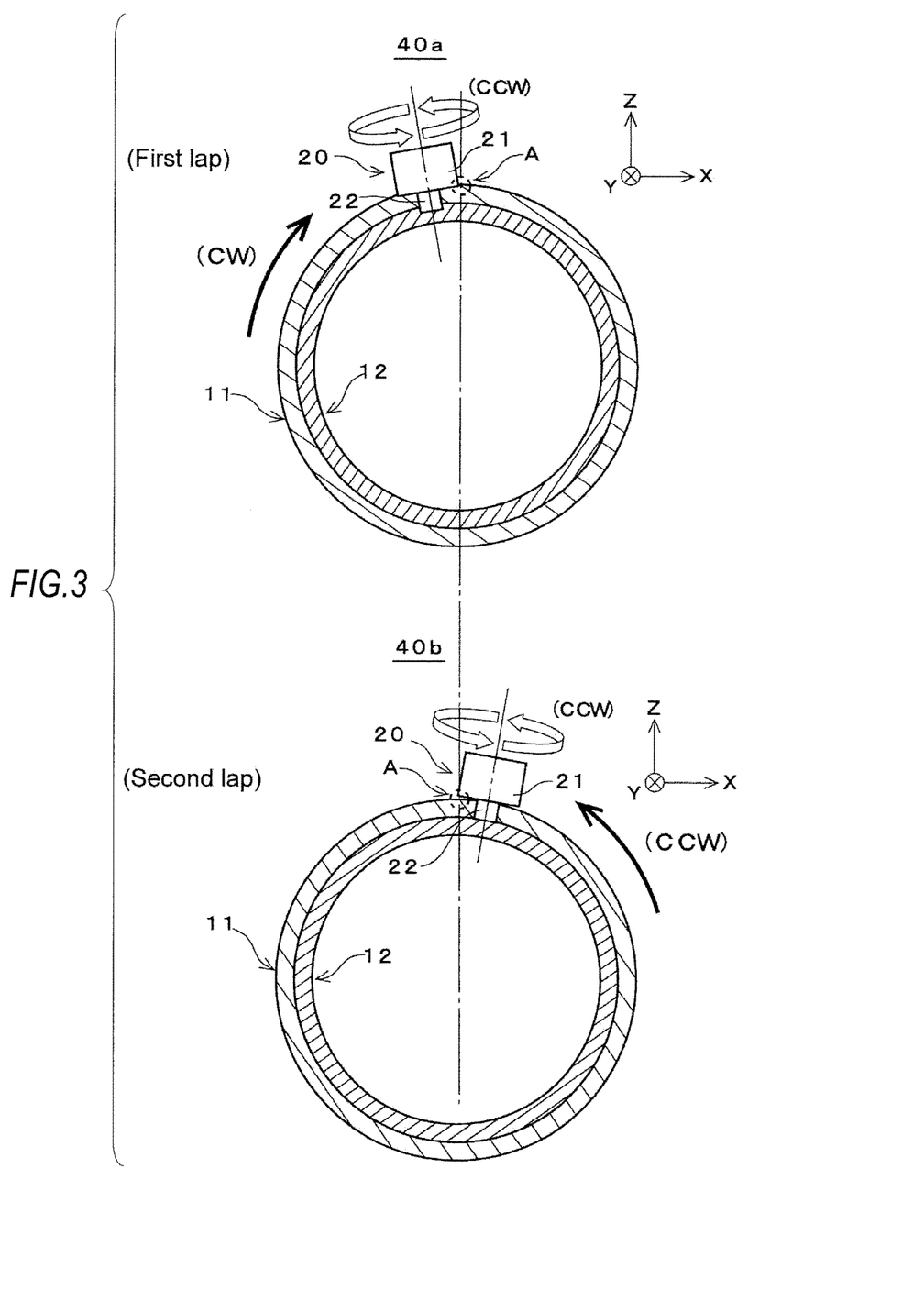
FIG. 3 is an explanatory drawing showing the moving direction of a friction stir welding tool, in the friction stir welding of a first lap and in the friction stir welding of a second lap.

FIG. 3 is an explanatory drawing showing the moving direction of the friction stir welding tool 20, in the first lap-friction stir welding 40a and in the second lap-friction stir welding 40b. Note that the right-handed coordinate system is used for the sake of clarity.

As shown in an upper part of FIG. 3, when the friction stir welding tool 20 moves (revolves) clockwise (CW) in the circumferential direction of the first shaft 11 while rotating counter clockwise (CCW), a force of a rotation speed component headed in the positive direction of the Y axis acts on part A of the first shaft 11. On the other hand, as shown in a lower part of FIG. 3, when the friction stir welding tool 20 moves (revolves) counter clockwise (CCW) in the circumferential direction of the first shaft 11 while continuing to rotate counter clockwise (CCW), a force of a rotation speed component headed in the negative direction of the Y axis acts on part A of the first shaft 11. That is, by reversing the moving direction of the friction stir welding tool 20 in the second lap from that in the first lap-friction stir welding 40a, a force of a rotation speed component in the direction opposite to the first lap can be applied on the same part. Thus, the AL burr 11c generated by the first lap-friction stir welding 40a can be returned to the base material and be recombined, as in the case of reversing the rotation direction of the tool 20 between the first and second laps.

Figure 4:
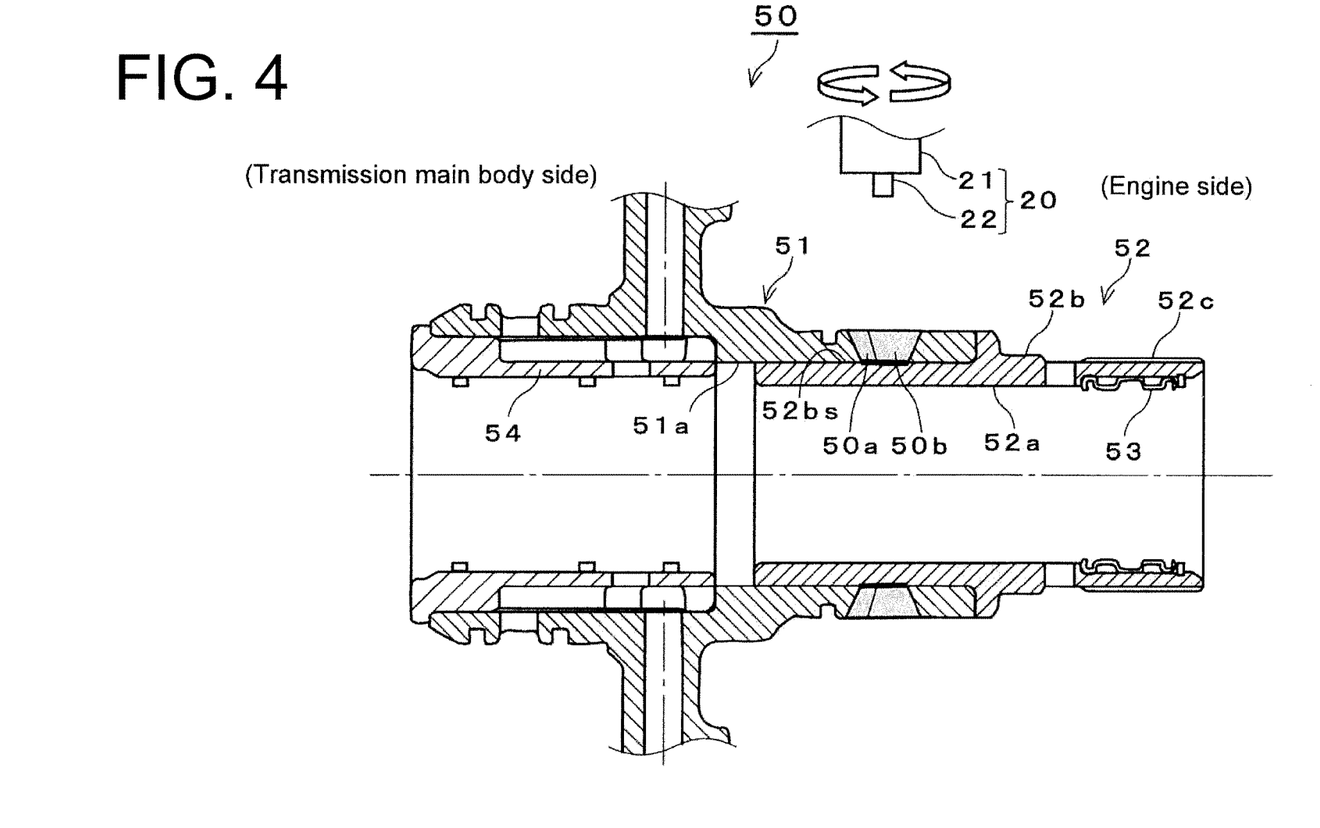
FIG. 4 is an explanatory drawing showing a stator shaft to which a dissimilar metal joining method of the embodiment is applied.

FIG. 4 is an explanatory drawing showing a stator shaft 50 to which the dissimilar metal joining method of the embodiment is applied. Note that a third shaft 54 and the friction stir welding tool 20 are also shown for the sake of clarity.

The stator shaft 50 is a shaft for supporting a stator (not shown) of a torque converter (not shown). Unlike conventional stator shafts entirely made of an iron-based metal, the stator shaft 50 is a dissimilar metal-joined shaft in which a tip end part requiring strength is configured of a second shaft 52 made of an iron-based metal, and a part other than the tip end part not requiring strength is configured of a first shaft 51 made of an aluminum-based light metal. Since the above stator shaft 50 is configured of an aluminum-based light metal except for the tip end part, the weight of the whole shaft can be reduced significantly.

Spline teeth 52c are formed along the circumferential direction on an outer surface of the tip end part of the second shaft 52, on the engine side. Meanwhile, a bearing 53 rotatably supporting a main shaft (not shown) is attached to the inner surface of the tip end part of the second shaft 52.

The first shaft 51 and the second shaft 52 are joined by friction stir welding, according to the dissimilar metal joining method according to the embodiment of the present invention described above. Specifically, friction stir welding 50a, 50b is applied for two laps along the circumferential direction, while pressing down the friction stir welding tool 20 on an axially-overlapped portion 52bs, where an inner surface 51a of the first shaft 51 and an outer surface 52b of the second shaft 52 overlap one another in the axial direction. This eliminates the substantial decrease in thickness and equivalent crack in the aluminum base material (first shaft 51) of the friction stir welding, and also repairs the recess (reduced thickness) on the surface of the aluminum base material.

Furthermore, the proportion of a heat-affected zone in the aluminum base material (first shaft 51) of the friction stir welding becomes smaller than in that joined by conventional friction stir welding, while the proportion of a stirred zone and plastic flow zone becomes large. Hence, bonding strength between the first shaft 51 and the second shaft 52 becomes larger than that when joined by conventional friction stir welding.

Note that the stator shaft 50 joined by the dissimilar metal joining method of the embodiment has about 30% higher tensile strength than that joined by conventional friction stir welding.

Hereinabove, the dissimilar metal joining method of the embodiment has been described with reference to the drawings. However, the embodiment of the present invention is not limited to the above embodiments, and various changes and modifications can be made within the technical scope of the present invention. For example, the friction stir welding tool 20 may be offset in the direction opposite to the second lap-friction stir welding 40b, and be moved along the circumferential direction of the first shaft 11 for another lap, i.e., for a total of three laps.

The first characteristic of a dissimilar metal joining method according to the above embodiments of the present invention is a dissimilar metal joining method of applying friction stir welding along a tangential direction over a predetermined length on an overlapped part (40) where a first metal (11) and a second metal (12) made of different materials overlap one another, by moving a tool (20) along the tangential direction while rotating and pressing the tool (20) down on the overlapped part of the first metal (11) and the second metal (12), characterized in that: the overlapped part (40) is subjected to friction stir welding by the tool (20) at least twice; in the first friction stir welding (40a), the tool (20) is moved along the tangential direction with the tool (20) penetrating the first metal (11) and inserted into the second metal (12) for a predetermined depth (D1–t1); and in the second friction stir welding (40b), the tool (20) is moved along the tangential direction with a position of the tool (20) offset for a predetermined distance (ΔL) in a direction perpendicular to the tangential direction.

In the above configuration, the second friction stir welding (40b) is done by moving the tool (20) along the tangential direction, with the position of the tool shifted (offset) for a predetermined distance (ΔL) in a direction perpendicular to the tangential direction. Hence, moving the pressing and rotating tool (20) causes metal burr (AL burr) generated in the first friction stir welding (40a) to be filled back into the original metal part and be recombined. With this, the base material after passage of the tool (t=t3) becomes thicker than in the first welding (t=t2). On the other hand, metal burr (steel burr) on the surface of the second metal (12) is removed by the tool (20), so that there is a less substantial decrease in the thickness of the stirred zone and plastic flow zone. As a result, bonding strength is improved in a joint part where both metals overlap one another.

Also, moving the pressing and rotating tool (20) over the heat-affected zone of the base material refines the structure of the heat-affected zone generated by the first friction stir welding, and changes the heat-affected zone into a stirred zone and plastic flow zone. Thus, in the base material of the friction stir welding, the heat-affected zone is reduced, while the stirred zone and plastic zone are enlarged. As a result, bonding strength is improved in the joint part where both metal members overlap one another.

Accordingly, when joining dissimilar metals made of different materials by friction stir welding, metal burr in a base material of the friction stir welding can be suppressed favorably, and also the proportion of a heat-affected zone in the base material can be reduced, while the proportion of a stirred zone and plastic flow zone can be enlarged. This can significantly improve bonding strength of a joint part, as compared to conventional friction stir welding.

The second characteristic of the dissimilar metal joining method according to the above embodiments of the present invention is that the tool (20) has a pin (22), and the predetermined distance (ΔL) is not larger than a width (W) of the pin.

In the above configuration, the offset distance (ΔL) of the tool (20) in the second friction stir welding (40b) is not larger than the width (W) of the pin. Hence, when the tool (20) moves while pressing and rotating in the second friction stir welding (40b), the tip end part of the pin (22) abuts on the metal burr (steel burr). As a result, the metal burr (steel burr) is removed by the pin (22).

The third characteristic of the dissimilar metal joining method according to the above embodiments of the present invention is that an insertion depth (D2) of the tool (20) into the first metal (11) and second metal (12) in the second friction stir welding (40b) is shallower than an insertion depth (D1) in the first friction stir welding (40a).

In the above configuration, the insertion depth (D2) of the tool (20) into the first metal (11) and second metal (12) in the second friction stir welding (40b) is shallower than the insertion depth (D1) in the first friction stir welding (40a). Hence, when the tool (20) moves while pressing and rotating, it can remove metal burr (steel burr) on the surface of the second metal (12), without newly generating metal burr (steel burr).

The fourth characteristic of the dissimilar metal joining method according to the above embodiments of the present invention is that an insertion depth (D2-t1) of the tool (20) into the second metal (12) in the second friction stir welding (40b) is shallower than an insertion depth (D1-t1) in the first friction stir welding (40a).

In the above configuration, the insertion depth (D2-t1) of the tool (20) into the second metal (12) in the second friction stir welding (40b) is shallower than the insertion depth (D1-t1) in the first friction stir welding (40a). Hence, when the tool (20) moves while pressing and rotating, it does not newly generate metal burr (steel burr), or the amount of metal burr (steel burr) can be minimized.

The fifth characteristic of the dissimilar metal joining method according to the above embodiments of the present invention is that a rotation direction of the tool (20) in the second friction stir welding (40b) is reversed from that in the first friction stir welding (40a).

In the above configuration, the rotation direction of the tool (20) in the second friction stir welding (40b) is reversed from that in the first friction stir welding (40a). Hence, when the tool (20) moves while pressing and rotating, the metal burr (AL burr) generated by the first friction stir welding receives a force of a rotation speed component in the reverse direction from the tool, and therefore is favorably returned to the original metal part. Thus, the metal burr (AL burr) fills up a recess (reduced thickness part) on the surface of the first metal (11). Meanwhile, metal burr (steel burr) on the surface of the second metal (12) is removed by the tool (20), so that there is a less substantial decrease in the thickness of the stirred zone and plastic flow zone. As a result, bonding strength is improved in the joint part where both metals overlap one another.

The sixth characteristic of the dissimilar metal joining method according to the above embodiments of the present invention is that a rotation speed of the tool (20) in the second friction stir welding (40b) is slower than that in the first friction stir welding (40a).

In the above configuration, the rotation speed of the tool (20) in the second friction stir welding (40b) is slower than that in the first friction stir welding (40a). That is, the rotation speed of the tool (20) in the second welding is made slower than that in the first welding to reduce the amount of heat generated by friction between the tool (20) and the base material, so that the influence of the newly generated heat-affected zone on bonding strength can be minimized.

The seventh characteristic of the dissimilar metal joining method according to the above embodiments of the present invention is that a moving direction of the tool (20) in the second friction stir welding (40b) is reversed from that in the first friction stir welding (40a).

In the above configuration, the moving direction of the tool (20) in the second friction stir welding (40b) is reversed from that in the first friction stir welding (40a). In this case, in terms of the direction in which the tool (20) approaches metal burr (AL burr), the tool (20) in the first welding approaches the metal burr from the front, whereas the tool (20) in the second welding approaches the metal burr from the rear, for example. In other words, the direction of a force of a rotation speed component that the metal burr (AL burr) receives from the tool (20) in the first welding is reversed from that in the second welding. Accordingly, by reversing the moving direction of the tool in the second welding from that in the first welding, it is possible to achieve similar effects as when reversing the rotation direction of the tool in the second welding from that in the first welding.

Hence, by reversing the moving direction of the tool (20) in the second friction stir welding (40b) from that in the first friction stir welding (40a), a recess (reduced thickness part) on the surface of the first metal (11) is filled up with the metal burr (AL burr). With this, the base material after passage of the tool (t=t3) becomes thicker than in the first welding (t=t2). On the other hand, metal burr (steel burr) on the surface of the second metal (12) is removed by the tool (20), so that there is a less substantial decrease in the thickness of the stirred zone and plastic flow zone. As a result, bonding strength is improved.

The eighth characteristic of the dissimilar metal joining method according to the above embodiments of the present invention is that a moving speed of the tool (20) in the second friction stir welding (40b) is faster than that in the first friction stir welding (40a).

In the above configuration, the moving speed of the tool (20) in the second friction stir welding (40b) is faster than that in the first friction stir welding (40a). That is, the moving speed of the tool (20) in the second welding is made faster than that in the first welding, to keep the frictional heat generated by friction between the tool (20) and the base material from being transmitted to other parts of the base material. Specifically, this prevents expansion of the heat-affected zone leading to degradation of bonding strength of the joint part.

A dissimilar metal-joined member according to the above embodiments of the present invention is characterized in that an overlapped part (40) where a first metal (11) and a second metal (12) made of different materials overlap one another, is joined by the dissimilar metal joining method according to any one of the above configurations.

The dissimilar metal-joined member mentioned above is joined by friction stir welding according to the dissimilar metal joining method of any one of the above configurations. Hence, it is favorably applicable to a structural member such as a stator shaft, whose specific parts require strength and hardness.

Obviously, numerous modifications and variations of the present invention are possible in light of the above teachings. It is therefore to be understood that within the scope of the appended claims, the invention may be practiced otherwise than as specifically described herein.

What is claimed is:

1. A metal joining method comprising:
applying friction stir welding along a tangential direction over a predetermined length on an overlapped part where a first metal and a second metal made of different materials overlap one another, by moving a tool in the tangential direction while rotating and pressing the tool down on the overlapped part of the first metal and the second metal, wherein:
the overlapped part is subjected to friction stir welding by the tool at least twice;
in the first friction stir welding, the tool is moved along the tangential direction with the tool penetrating the first metal and inserted into the second metal for a predetermined depth to generate a first burr flaking off from the first metal and a second burr flaking off from the second metal; and
in the second friction stir welding, the tool is moved along the tangential direction with a position of the tool offset for a predetermined distance in a direction perpendicular to the tangential direction, wherein an insertion depth of the tool in the second friction stir welding is shallower than an insertion depth in the first friction stir welding such that the tool recombines the first burr with the first metal and removes the second burr.

2. The metal joining method according to claim 1, wherein:
the tool has a pin; and
the predetermined distance is not larger than a width of the pin.

3. The metal joining method according to claim 1, wherein
a rotation direction of the tool in the second friction stir welding is reversed from that in the first friction stir welding.

4. The metal joining method according to claim 1, wherein
a rotation speed of the tool in the second friction stir welding is slower than that in the first friction stir welding.

5. The metal joining method according to claim 1, wherein
a moving direction of the tool in the second friction stir welding is reversed from that in the first friction stir welding.

6. The metal joining method according to claim 1, wherein
a moving speed of the tool in the second friction stir welding is faster than that in the first friction stir welding.

7. A metal joined member wherein
an overlapped part where a first metal and a second metal made of different materials overlap one another, is joined by the dissimilar metal joining method according to claim 1.

8. A metal joining method comprising:
moving a tool on a first metal along a first track on an overlapped part where the first metal is overlapped on a second metal while the tool is rotated around an axis of the tool and is pressed along the axis against the first metal such that the tool penetrates the first metal and is inserted into the second metal by a first insertion depth, the first metal being made of a first material which is different from a second material which the second metal being made of, the first metal and the second metal being joined at the first track via a friction stir welding to generate a first burr flaking off from the first metal and a second burr flaking off from the second metal;
moving the tool from the first track to a second track which is on the overlapped part and which is substantially parallel to the first track after the tool has moved along an entirety of the first track; and
moving the tool on the first metal along the second track on the overlapped part while the tool is rotated around the axis and is pressed against the first metal along the axis, wherein a second insertion depth of the tool while moving along the second track is shallower than the first insertion depth such that the tool recombines the first burr with the first metal and removes the second burr.

9. The metal joining method according to claim 8, wherein:
the tool has a pin; and
a gap between the first track and the second track in a direction perpendicular to both the first track and the second track is not larger than a width of the pin.

10. The metal joining method according to claim 8, wherein
a total insertion depth of the tool into the first metal while the tool is moved along the second track is smaller than a total insertion depth of the tool into the first metal and second metal while the tool is moved along the first track.

11. The metal joining method according to claim 8, wherein:
the tool is moved along the second track while the tool is rotated around the axis and is pressed against the first metal along the axis such that the tool is inserted into the first metal by a second insertion depth; and the second insertion depth is smaller than the first insertion depth.

12. The metal joining method according to claim 8, wherein
a rotation direction of the tool while the tool is moved along the second track is reversed from a rotation direction of the tool while the tool is moved along the first track.

13. The metal joining method according to claim 8, wherein
a rotation speed of the tool while the tool is moved along the second track is slower than a rotation speed of the tool while the tool is moved along the first track.

14. The metal joining method according to claim 8, wherein
a moving direction of the tool while the tool is moved along the second track is reversed from a moving direction of the tool while the tool is moved along the first track.

15. The metal joining method according to claim 8, wherein
a moving speed of the tool while the tool is moved along the second track is faster than while the tool is moved along the first track.

16. A metal joined member wherein
the first metal is joined to the second metal at the overlapped part by the metal joining method according to claim 8.

17. The metal joining method according to claim 1, wherein:
the overlapped part has a boundary between the first metal and the second metal before the first friction stir welding;
the tool crosses the boundary in the first friction stir welding; and
the tool does not cross the boundary in the second friction stir welding.

18. The metal joining method according to claim 8, wherein:
the overlapped part has a boundary between the first metal and the second metal before the tool is moved along the first track;
the tool crosses the boundary when the tool is moved along the first track; and
the tool does not cross the boundary when the tool is moved along the second track.

* * * * *